3,033,857
HECOGENIN AZINE AND ALKYLIDEN-
AZINOTIGOGENINS
Luis E. Miramontes, Mexico City, Mexico, assignor to
G. D. Searle & Co., Chicago, Ill., a corporation of
Delaware
No Drawing. Filed May 7, 1959, Ser. No. 811,528
Claims priority, application Mexico Mar. 9, 1956
8 Claims. (Cl. 260—239.55)

The present invention relates to a method of separating hecogenin from a complex mixture of sapogenins and typically from mixtures of hecogenin with non-oxo-sapogenins such as tigogenin, sarsasapogenin, diosgenin and the like.

Such complex mixtures of sapogenins which contain hecogenin have in the past been resolved by the application of various solvents to effect a selective solution of the desired compounds and fractional recrystallization from the crude mixtures. These prior processes are quite laborious and require numerous extractions and recrystallizations to effect separation of products. The processes were not efficient and the compounds produced were of a low order of purity.

The present invention provides for an economical separation of secogenin, a valuable chemical for the preparation of such cortical steroids as cortisone, by a simple process which can be carried out under fairly primitive conditions.

According to the process of this invention the mixture of hecogenin with other sapogenins lacking an oxo-group (typically tigogenin) is treated with a hydrazine derivative of the type R—NH—NH$_2$, wherein R is hydrogen, a lower alkyl radical or a —CS—NH$_2$ radical. There is thus formed a hydrazone derivative of hecogenin as an oily liquid which is more soluble than the non-oxo-sapogenin in polar solvents, and especially in lower alkanols. The oily hydrazone intermediates of the structural Formula I:

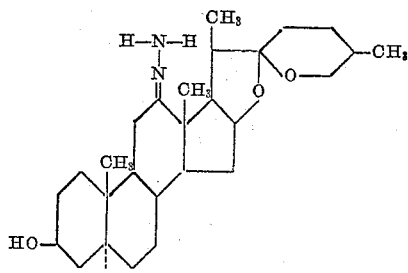

can be conveniently converted to an azine of the structural Formula II:

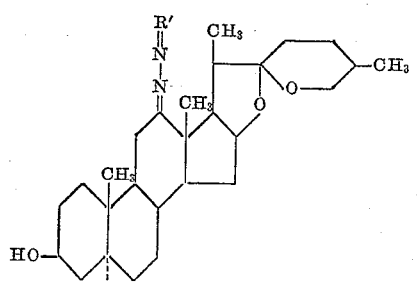

wherein R′ is a member of the group consisting of tigogenin-12-yl radical and radicals of the formula

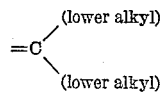

The azines of this invention are readily isolated in crystalline form and can be purified by washing with solvents. The hydrolysis of the azines to hecogenin of a very high degree of purity can also be readily accomplished.

Hecogenin azines (the compound of the preceding Formula II wherein R is a tigogenin-12-yl radical) can be conveniently prepared by one of the following processes:

(a) The hydrazone is refluxed for about 3 minutes to an hour, typically 10 to 30 minutes in an acid to which a small amount of ethanol or a solution of hydrogen chloride in ethanol can be added. The mixture is then dried by evaporation of the acid to obtain the corresponding azine. Typically, the alcoholic filtrate containing the hydrazone derivative of hecogenin after removal of the non-oxo-sapogenin is adjusted to pH 6 by the addition of such acids as formic acid, acetic acid, or hydrochloric acid, after which the mixture is heated at reflux.

(b) The hydrazone solution, typically obtained after filtration from the tigogenin or other non-oxo-sapogenin, is vacuum distilled and then heated for a period of three minutes to an hour at a temperature of about 180–220° C.

(c) The dry oily hydrazone of tigogenin is refluxed in a lower alkanol with a small amount of pyridine hydrochloride for a period of about 10 minutes to one hour, preferably 20 to 45 minutes. Thereafter, the solution is rendered alkaline and heated until crystallization occurs. The solid is collected by filtration.

(d) The hydrazone of tigogenin is refluxed in high boiling solvents such as tetralin or the monoethyl ether of ethylene glycol for a period of 10 minutes to one hour.

Lower alkanol solvents useful in the foregoing procedure are particularly ethanol, methanol, the propanols, tertiary butanol and the like.

The foregoing procedures are particularly useful for the preparation of hecogenin azine. However, it has also been found useful to carry out the condensation of a hecogenin hydrazone of the Formula I with ketones and aldehydes. The lower alkanones, such as acetone, butanone, 2-pentanone, 3-pentanone, 2-hexanone, and the like can be used. The resulting azines of the formula

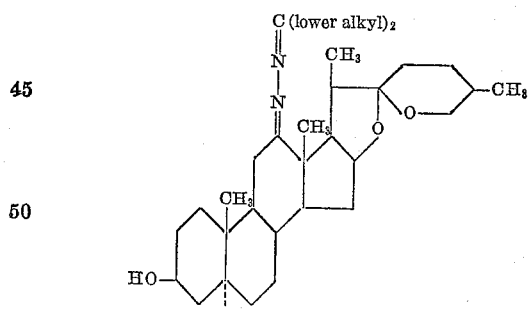

are solids which are very readily purified by crystallization. It is particularly convenient and economical to react the unsubstituted oily hydrazone of hecogenin with a lower alkanone such as acetone to form the solid azine.

Pure hecogenin can be recovered from the azines of this invention by hydrolysis with acid, or by refluxing a solution of the azine in a lower alkanol alone or admixed with a less polar solvent such as chloroform for 15 minutes to one hour at a pH of about 1 to 2.

The sapogenin mixtures in the examples given below were obtained by extraction of dry acid hydrolyzates of Mexican Agave fourcroyoides. Extracts of other plant species containing mixtures of hecogenin with non-oxo-sapogenins can likewise be used for the isolation of hecogenin of a high degree of purity of this procedure.

The azine compounds of this invention, their preparation and their hydrolysis to pure hecogenin will be illustrated further in the examples. These are given for the purpose of illustration only and are not to be construed as limiting the invention in spirit or in scope.

The present invention is a continuation-in-part of copending application Serial No. 641,852 filed February 25, 1957, now Patent No. 3,013,010.

EXAMPLE 1

Two grams of a mixture of sapogenins, containing hecogenin and other genins lacking the 12-oxo group such as tigogenin, are dissolved in 20 ml. of ethanol and 4 ml. of hydrazine hydrate are added. The reaction mixture is refluxed for 24 hours. The length of time required for completion can be checked by disappearance of the carbonyl band from the infrared absorption spectrum of the sample. After completion of the reaction, 12 ml. of solvent are distilled off at atmospheric pressure. The residue is then chilled, preferably at 0° C. for two hours, and the crystalline material thus produced is filtered and washed with a small amount of ice cold ethanol. Tigogenin thus obtained melts at about 194–198° C.

The alkaline alcoholic filtrate containing hecogenin hydrazone is adjusted to pH 6 with hydrochloric acid and refluxed for 15 minutes. The hecogenin azine thus obtained is filtered and washed with water. The compound has the structural formula

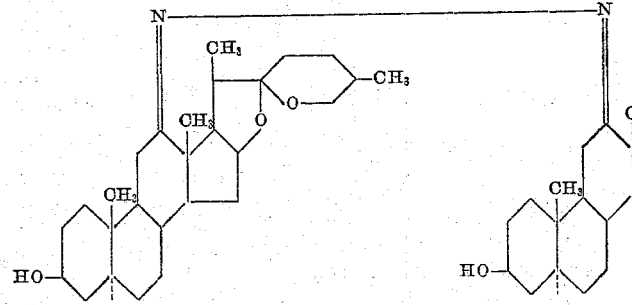

As a modification of this procedure the alkaline alcoholic filtrate containing hecogenin hydrazone is dried under vacuum and recrystallized repeatedly from a mixture of ethyl acetate and hexane to yield crystals melting at about 205–207° C. Conversion to the azine can be carried out as above.

As a further modification thiosemicarbazide or a lower alkylhydrazine hydrate, typically ethylhydrazine hydrate, can be substituted for the hydrazine hydrate.

EXAMPLE 2

5 grams of the sapogenin mixture is refluxed for 12 hours with a mixture of 25 ml. of ethylene glycol monoethyl ether and 5 ml. of hydrazine hydrate. 0.05 gram of activated carbon and 0.5 gram of diatomaceous earth are then added and the mixture is filtered. The solution is chilled to 0° C. and the tigogenin crystals are filtered, washed with a small quantity of cold ethylene glycol monoethyl ether and dried.

The filtrate is distilled to dryness under vacuum giving rise to an oily residue. Chromatography of this material over an adsorbent composed of 85% silicon dioxide and 15% of magnesium dioxide yields a colorless soil, which, when dried, is a resinous material.

Prolonged heating at 210° C. transforms the resinous hecogenin hydrazone to the hecogenin azine. Alternatively, the azine can be formed by adjustment of the resinous material to pH 6 with mineral acid and refluxing for 15 minutes.

According to still another procedure, 3 grams of the resinous hecogenin hydrazone are refluxed for 30 minutes with 10 ml. of ethanol and 0.3 gram of pyridine hydrochloride. A crystalline solid precipitates out of this solution which is filtered from the hot mixture and washed with hot ethyl acetate to eliminate traces of trigogenin and other sapogenins. Hecogenin azine thus obtained melts at about 329–331° C.

EXAMPLE 3

10 grams of oily resinous hecogenin hydrazone, described in Example 2, are refluxed with 10 ml. of acetone for 60 minutes. The mixture is cooled to 0–5° C. and the crystals are collected on the filter. 12-isopropylidenazinotigogenin thus obtained can be recrystallized from a mixture of chloroform and acetone and then melts at about 206–208° C. The compound has the structural formula

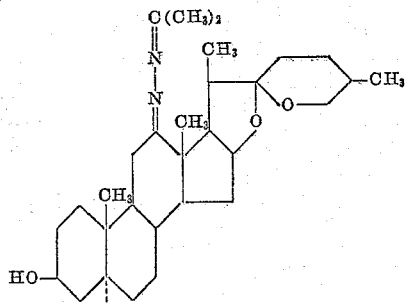

Following the procedure of this example, but substituting methylethyl ketone, diethyl ketone, methylpropyl ketone, methylisobutyl ketone, or methylhexyl ketone for acetone there are obtained respectively 12-(2-butylidine)azinotigogenin, 12-(3-pentylidine)azinotigogenin, 12-(4-methyl-2-pentylidine)azinotigogenin and 12-(2-octylidine)azinotigogenin.

EXAMPLE 4

A solution of 2 grams of the sapogenin mixture in 20 ml. of ethanol and 4 ml. of hydrazine hydrate are refluxed for 24 hours. The excess hydrazine is recovered for reuse by concentration of the reaction mixture to dryness. The mixed dry residue obtained in the initial reaction for the preparation of the hydrazone derivative of hecogenin is refluxed in 10 ml. of ethanol and filtered from the insoluble residue of oxosapogenin. The non-oxosapogenin in the solid filter cake is dissolved in 10 ml. of ethanol and concentrated to a volume of 7 ml., chilled to 0° C. and allowed to stand for 24 hours to yield tigogenin. The solution of the hecogenin hydrazone is then adjusted to a pH of 6 and heated under reflux for 15 minutes, concentrated to a volume of 6 ml., and chilled to 0° C. Crystals of the hecogenin azine thus obtained are filtered, washed and dried.

EXAMPLE 5

2 grams of hecogenin azine are refluxed for 30 minutes with 10 ml. of ethanol, 10 ml. of chloroform, 2 ml. of water and 2 ml. of concentrated hydrochloric acid. Then 0.8 gram of sodium hydroxide in 2 ml. of water are added, and the solvents are distilled off until abundant crystallization has occurred. The suspension is then filtered and the crystals are washed with hot water and dried to obtain a good grade of hecogenin.

EXAMPLE 6

Following the procedure of the preceding example the alkylidineazinohecognenins described in Example 3 can likewise be hydrolyzed to hecogenin. Sufficient concentrated hydrochloric acid is used to lower the pH to 1.

What is claimed is:
1. A compound of the structural formula

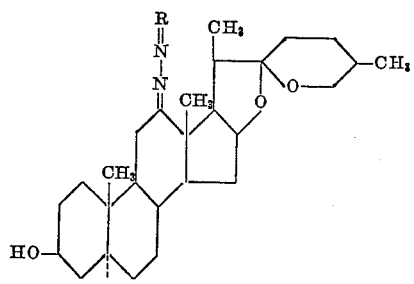

wherein R is a member of the group consisting of the tigogenin-12-yl radical and radicals of the formula

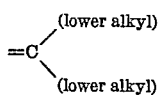

2. Hecogenin azine.
3. A compound of the structural formula

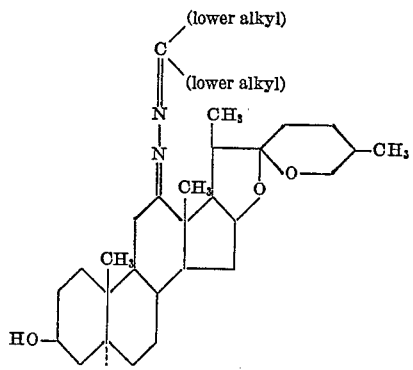

4. 12-isopropylidenazinotigogenin.
5. The process for preparing hecogenin azine which comprises heating a member of the class consisting of the hydrazone, the lower alkylhydrazone and the thiosemicarbazone of hecogenin at a temperature in the range of 180–220° C.
6. The process for preparing hecogenin azine which comprises heating hecogenin hydrazone in a lower alkanol at a pH in the range of 5 to 7.
7. The process for preparing hecogenin azine which comprises heating hecogenin hydrazone with pyridine hydrochloride.
8. The process for preparing a compound of the structural formula

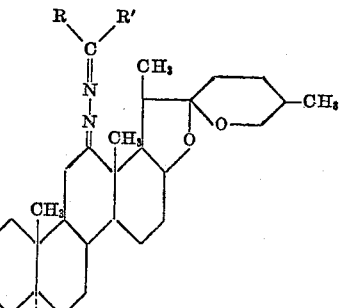

wherein R and R' are lower alkyl radicals which comprises heating of hecogenin hydrazone with a compound of the formula R—CO—R', wherein R and R' are defined as hereinabove.

References Cited in the file of this patent
UNITED STATES PATENTS

| | | |
|---|---|---|
| 2,408,834 | Wagner | Oct. 8, 1946 |
| 2,408,835 | Wagner | Oct. 8, 1946 |

OTHER REFERENCES

Fieser: Natural Products Related to Phenanthrene, 3rd Ed., (1949), pages 308–309.
Miramontes et al.: Chem. & Industry, Nov. 29, 1958, page 1595.